United States Patent [19]

Endoh et al.

[11] Patent Number: 5,003,410
[45] Date of Patent: Mar. 26, 1991

[54] SYSTEM FOR RECORDING/REPRODUCING AN INFORMATION SOURCE HAVING AN APPARATUS SPECIFIC IDENTIFICATION SIGNAL

[75] Inventors: Kenjiro Endoh, Tokyo; Osamu Yasuda, Kawasaki, both of Japan

[73] Assignee: Kabushiki Kaisha Toshiba, Kawasaki, Japan

[21] Appl. No.: 434,791

[22] Filed: Nov. 13, 1989

Related U.S. Application Data

[63] Continuation of Ser. No. 187,041, Apr. 27, 1988, Pat. No. 4,924,328.

[30] Foreign Application Priority Data

Jun. 30, 1987 [JP] Japan .................................. 62-160908
Jun. 30, 1987 [JP] Japan .................................. 62-160909

[51] Int. Cl.$^5$ ........................ G11B 15/04; G11B 5/02
[52] U.S. Cl. ........................................ 360/60; 360/27
[58] Field of Search ................................ 360/60, 27

[56] References Cited

U.S. PATENT DOCUMENTS 4,775,901 10/1988 Nakano .................................. 360/60

*Primary Examiner*—Vincent P. Canney
*Attorney, Agent, or Firm*—Cushman, Darby & Cushman

[57] ABSTRACT

An input section inputs a recording signal to be recorded on a recording medium. An identification signal generator generates a predetermined identification signal. A processor is connected to the input section and the identification signal generator, and selectively processes the recording signal and the identification signal. A detector is connected to the input section, the identification signal generator, and the processor, and detects the presence of a recording restriction signal from the recording signal so as to control the processor in accordance with a detection result. A recording section receives an output signal from the processor, and records the signal on the recording medium.

15 Claims, 8 Drawing Sheets

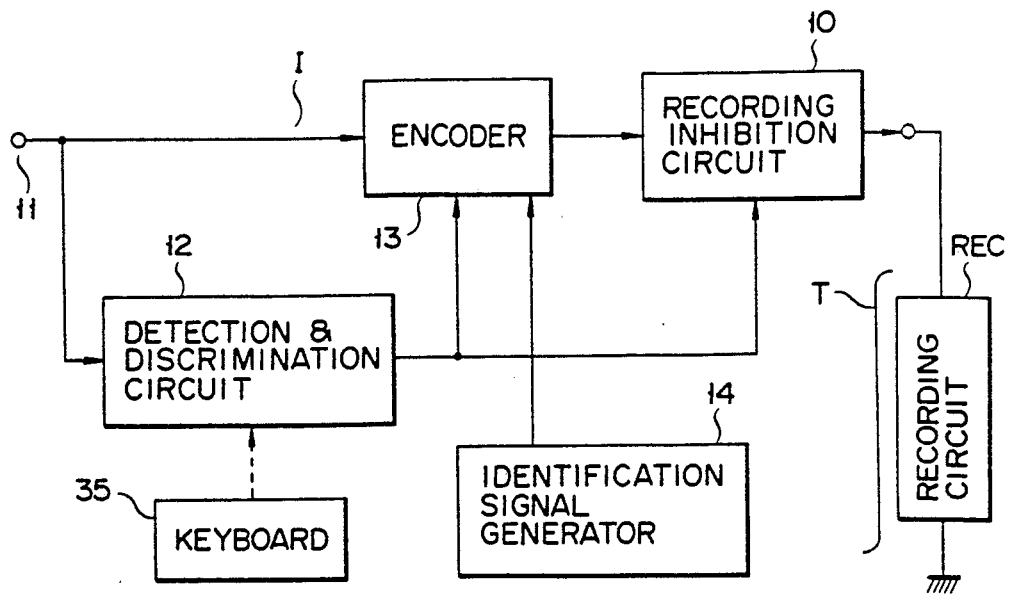
F I G. 2
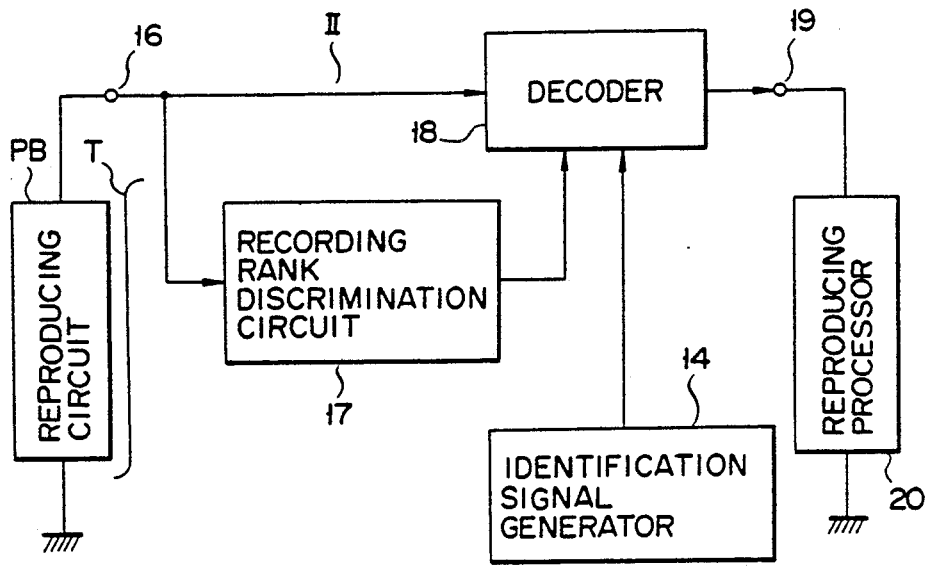
F I G. 3

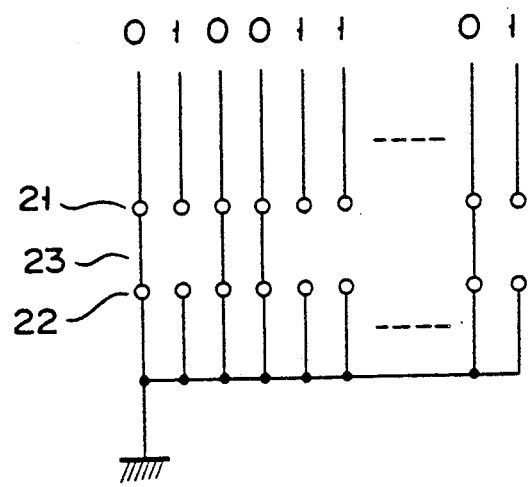
F I G. 4
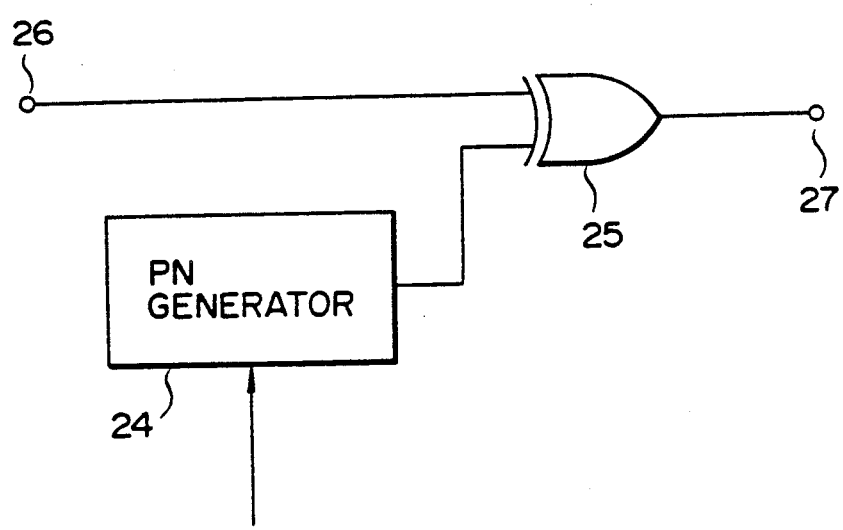
F I G. 5

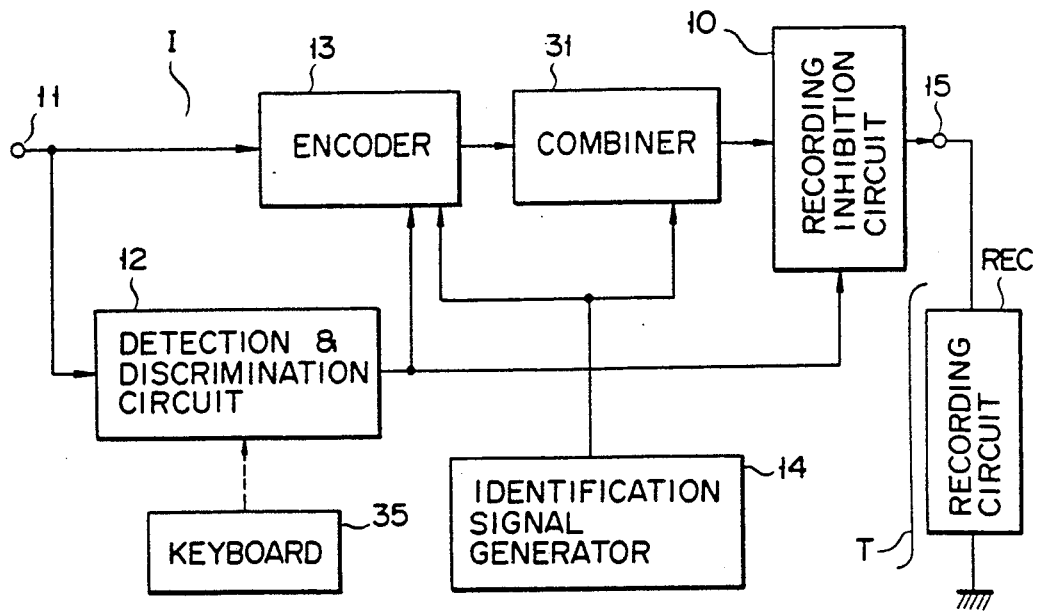
F I G. 6
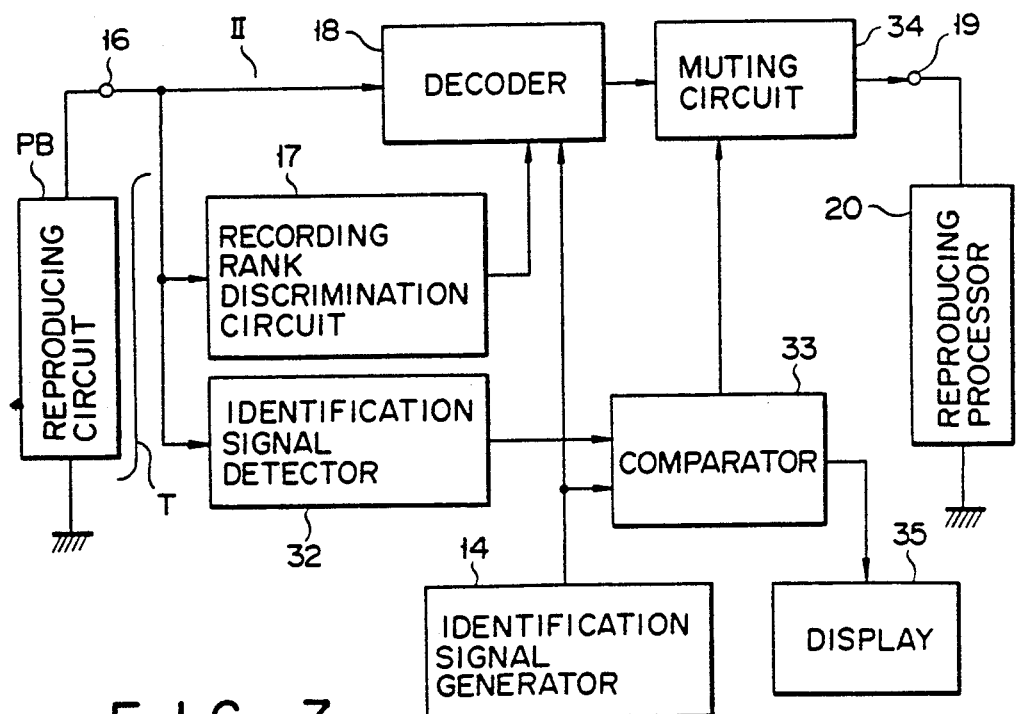
F I G. 7

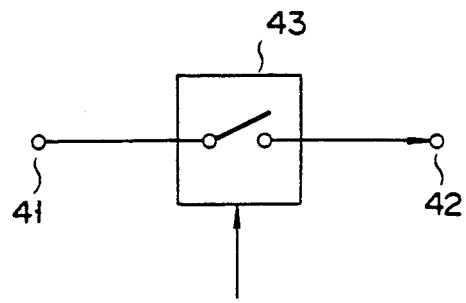
F I G. 10
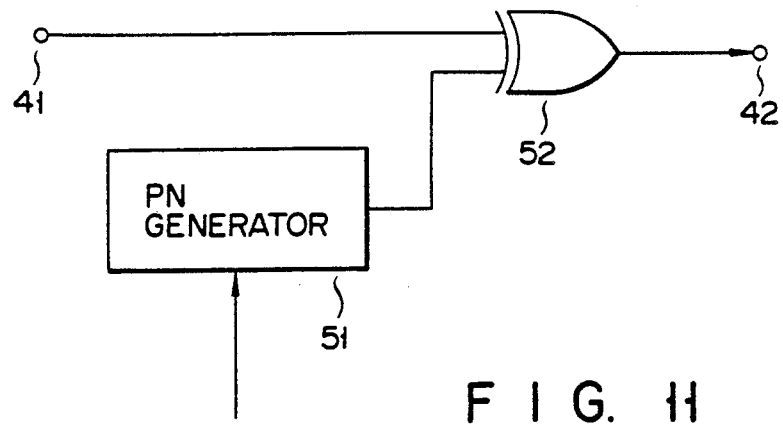
F I G. 11
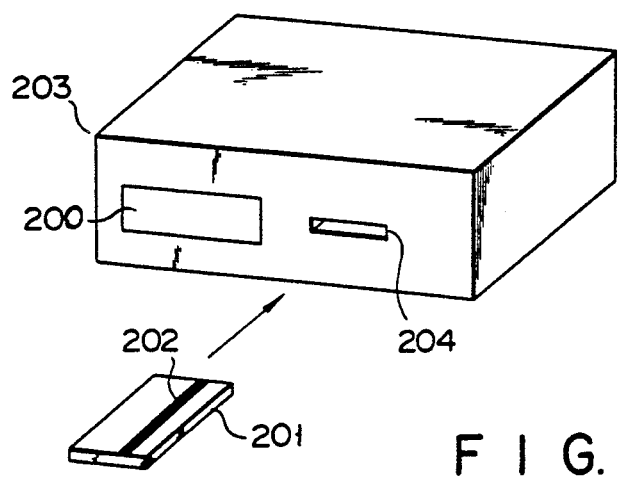
F I G. 12

SYSTEM FOR RECORDING/REPRODUCING AN INFORMATION SOURCE HAVING AN APPARATUS SPECIFIC IDENTIFICATION SIGNAL

This is a continuation of application No. 07/187,041, filed Apr. 27, 1988 now Pat. No. 4,924,328.

BACKGROUND OF THE INVENTION

1. Field of the Invention

This invention generally relates to a recording/reproducing system and, more particularly, to a recording/reproducing system which can provide a predetermined restriction on recording/reproduction.

2. Description of the Related Art

In current systems of recording/reproducing an information source such as an audio or image signal, a variety of recording/reproducing systems such as a magnetic system, an optical system, and the like are proposed for, e.g., a variety of dynamic (storage) recording media including a tape-like recording medium, a disk-like recording medium, a card-like recording medium, and the like. These recording systems are put into various practical applications. These recording/reproducing systems preferably have recording/reproducing characteristics of high fidelity, as well as good operability. In addition, these systems preferably comprise functions requested by users as much as possible unless a social problem against, e.g., public order and morals, arises.

In the recording/reproducing systems as described above, recording media and recording/reproducing systems are dealt with independently. As along as recording/reproducing systems of an identical type are used, recording media have compatibility to be subjected to recording or reproduction in any apparatus. However, in some recording/reproducing systems to which no restriction for recording for the purpose of making a copy is provided, sometimes a user cannot easily record information since the recording media have compatibility.

Assuming that a recording medium which has recorded an information source is commercially available, if a purchaser makes a copy of the information source, the recording medium (copy) on which the information source is recorded by copying and one (original) on which the information source was originally recorded have an identical value. For this reason, if such copying is illegally performed in a large quantity for benefits by utilizing the compatibility of recording/reproducing systems, the value of the original recording medium on which the information source is recorded is largely reduced. In addition, the higher the fidelity of copies becomes, the lower the originality of the original recording medium becomes.

To prevent this, a countermeasure for inhibiting such copying is inevitably taken. However, a conventional copy inhibition method described below is not satisfactory for a user. More specifically, in the conventional copy inhibition method, a signal representing a predetermined inhibition code is inserted in an information source and is recorded on a recording medium. If a recording/reproducing system detects the inhibition code in a transmission signal of a recording information source, it interrupts the recording function. For example, as an information source (in this case, a digital signal) is reproduced, if a transmission format is a group of blocks (consisting of 1 to m bits), a predetermined position (nth-bit position) of each block or a specific block, is assigned to a flag representing inhibition: "0" or permission: "1" of a recording operation. The flag (or a code combining the flags) is detected by a recording/reproducing system which received a reproduction signal. If the flag represents inhibition of the recording operation, the recording function is interrupted. Interruption of the recording function can be achieved by various methods, such as disconnection of a signal path. If such a countermeasure is taken for all the recording/reproducing systems of an identical type, an information source including an inhibition code can be inhibited from being copied.

However, in the conventional method, copying the information source with the inhibition code is perfectly inhibited, as is recording an information source which does not reduce a value of a recording medium. Thus, recording for personal use cannot be performed, either.

Upon developments of digital audio tape recorders (DATs), a conflict of interests as described above, arises between copyrights of soft tapes for the DATs and/or conventional compact disks (CDs) and cancellation of copy inhibition for personal use that is permitted legally or by judgement.

In the recording/reproducing systems which employ a conventional copy inhibition method, where restriction on copying is too complete or is not made at all, a recording/reproducing operation for personal use desired by a user cannot often be satisfied. As a result, applications of the recording/reproducing system having good performance, such as DATs, are limited, thus preventing their wide spread use.

This conflict interferes with industrial promotion of such products, and is disadvantageous for a user. Therefore, a strong demand has arisen for development of a recording/reproducing system having a predetermined copy restriction function which can provide a solution agreeable to both the copyright holder (including software industries) and the user.

In addition to a problem concerning a commercial information source, a user may want a recording/reproducing function for preventing a third party to easily copy or reproduce a source recorded by a user, except for his personal use. The conventional recording/reproducing system which does not restrict copying at all, or which employs the above-mentioned copy inhibition method cannot meet such a requirement of the user.

SUMMARY OF THE INVENTION

Therefore, it is an object of the present invention to provide a new and improved recording/reproducing system with a record restriction function which can selectively inhibit recording/reproducing based on a predetermined restriction in order to satisfy a personal use requirement of a user.

According to a first aspect of the present invention, there is provided a recording apparatus with a record restriction function, the apparatus comprising:
   input means for inputting a recording signal to be recorded on a recording medium;
   identification signal generating means for generating a predetermined identification signal;
   processing means, coupled to the input means and the identification signal generating means, for selectively processing the recording signal and the identification signal;

detection means, coupled to the input means, the identification signal generating means, and the processing means, for detecting a recording restriction signal from the recording signal, and controlling the processing means in accordance with a detection result; and recording means for receiving an output signal from the processing means and recording the output signal on the recording medium.

According to a second aspect of the present invention, there is provided a recording apparatus comprising generation means for generating a predetermined index signal, recording means for recording a signal while the index signal is added to a recording signal, detection means for detecting the index signal from the recording signal, and inhibition means for inhibiting recording by the recording means when the index signal is detected from the recording signal.

With the above arrangement, when an information source is recorded, the recording means records the source after it adds a predetermined index signal (e.g., an identification code of an individual recording apparatus) to the information source or its sub signal (processing such as insertion or substitution). When the signal recorded in this manner is reproduced and recorded again, the detection means detects the index signal. The inhibition means inhibits recording in accordance with the detection output. Therefore, copying from a copied recording medium can be prevented and a predetermined restriction can be provided on copying.

According to a third aspect of the present invention, there is provided a recording apparatus comprising generation means for generating a specific identification signal, recording means for at least partially encoding a recording signal using the identification signal, discrimination means for discrimination whether the recording signal to be recorded is already encoded or not, and inhibition means for inhibiting recording by the recording means when the recording signal is already encoded.

With the above arrangement, when an information source is recorded, an information source or its sub signal is encoded using a specific identification signal (e.g., an identification code of an individual recording/reproducing system). When the signal recorded in this manner reproduced and is recorded again, the discrimination means detects the identification signal. The inhibition means inhibits recording in accordance with the discrimination means output. Therefore, copying from a copied recording medium can be prevented, and a predetermined restriction can be provided on copying.

According to a fourth aspect of the present invention, there is provided a recording/reproducing system which comprises a recording apparatus comprising means for generating a specific identification signal, and means for detecting a predetermined input signal to record a signal in a state wherein the specific identification signal is added to a recording signal, and a reproducing apparatus which comprises means for detecting an identification signal from a read signal, and for discriminating whether the identification signal coincides with the specific identification signal, and means for disturbing the outputting of the read signal when the discrimination result indicates a noncoincidence.

With this arrangement, when a copy restricted information source is recorded, an input signal indicating this is detected, and the signal is recorded while a specific identification signal (e.g., a code signal of an individual recording/reproducing system) is added to the information source or its sub code (e.g., processing such as insertion or substitution). When the signal recorded in this manner is reproduced, the recording signal can be normally reproduced only when an identification signal detected from the read signal coincides with the self-identification signal of the recording/reproducing system, i.e., only when the specific identification signal is known. In this manner, unless the specific identification signal added upon recording is known (or is generated), the recording signal cannot be reproduced by a recording apparatus different from the one which was used for recording, thus providing a predetermined restriction on copying.

According to a fifth aspect of the present invention, there is provided a recording/reproducing system which comprises a recording apparatus having means for generating a specific identification signal, and means for detecting a predetermined input signal to at least partially encode a recording signal using the specific identification signal, and a reproducing apparatus having means for decoding the signal encoded by the specific identification signal.

With the above arrangement, when a copy restricted information source is copied, an input signal indicating this is detected, and the information source or its sub signal is encoded using a specific identification signal (e.g., a code signal of an individual recording/reproducing system). When the signal recorded in this manner is to be reproduced, the recording signal can be decoded only when the specific identification signal is known. In this manner, unless a specific identification signal used upon recording is known (or is generated), the recording signal cannot be reproduced by a recording apparatus different from one which was used for recording, thus providing a predetermined restriction on copying.

BRIEF DESCRIPTION OF THE DRAWINGS

These and other objects and features of the present invention can be understood through the following embodiments by reference to the accompanying drawings, in which:

FIG. 2 is a block diagram showing an arrangement of a recording section of a recording/reproducing system according to a first embodiment of the present invention;

FIG. 3 is a block diagram showing an arrangement of a reproducing section of the recording/reproducing system of the first embodiment;

FIG. 4 is a circuit diagram showing an identification signal generator of the first embodiment;

FIG. 5 is a circuit diagram showing an encoder and decoder of the first embodiment;

FIGS. 6 and 7 are block diagrams respectively showing arrangements of recording and reproducing sections of a recording/reproducing system according to a second embodiment of the present invention;

FIGS. 10 and 11 are circuit diagrams showing an output disturbing circuit of the third embodiment;

FIG. 12 is a perspective view showing an application or service system of a recording/reproducing system according to the present invention;

DETAILED DESCRIPTION OF THE PREFERRED EMBODIMENTS

Figure 1:
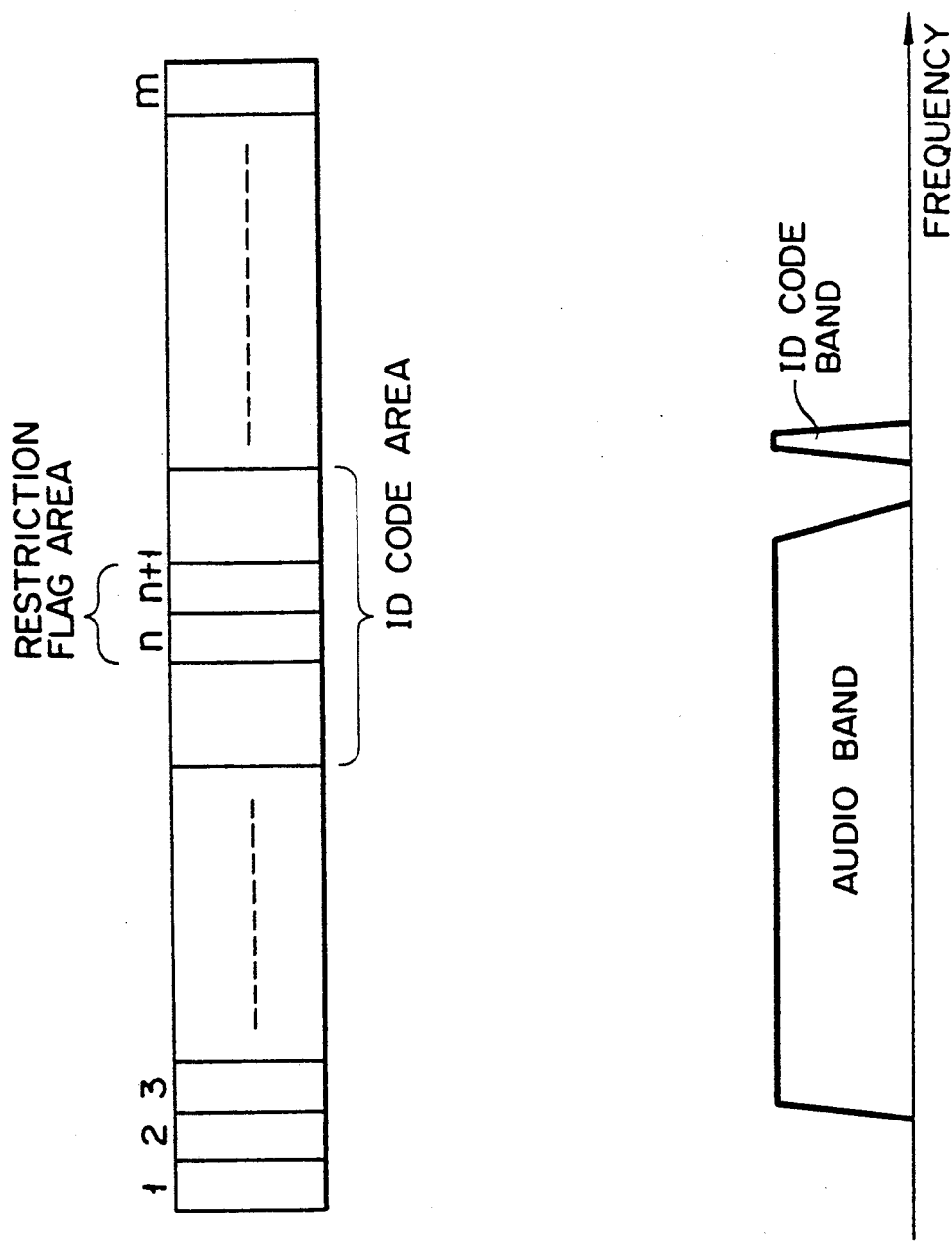
FIG. 1A is a view showing a format of a digital information signal input to a recording/reproducing system.
FIG. 1B is a view showing a format of an analog information signal input to the recording/reproducing system.

Some embodiments of the present invention will hereinbelow be described.

FIGS. 1 to 5 show a recording/reproducing system according to a first embodiment of the present invention. FIG. 2 shows an arrangement of a main portion of recording section I of a recording/reproducing system of this embodiment. In FIG. 2, a recording information source is input to recording input terminal 11. In this case, the information source is a digital signal having a format shown in FIG. 1A, and has a restriction flag at its nth and (n+1)th bits. When the restriction flag is set to be "00", it represents the presence of a copy restriction; "11", no restriction. Such an information source can be a signal or the like reproduced from a commercially available tape-like recording medium, i.e., a software tape. The input signal, including the restriction flag, is supplied from recording input terminal 11 to detection & discrimination circuit 12 and encoder 13. Detection & discrimination circuit 12 detects the restriction flag from the input signal, and discriminates whether the detected restriction flag is "00" or "11". Circuit 12 controls encoder 13 in accordance with the discrimination result. More specifically, when circuit 12 detects that the restriction flag is "00" (presence of restriction), or (rank R), it causes encoder 13 to encode the input signal. Encoder 13 receives a self identification (ID) signal from ID signal generator 14. If the discrimination result corresponds to rank R, encoder 13 processes (e.g., scrambles) the input signal using the ID signal, and changes the restriction flag to be "01" (encoded), or (rank E). The signal processed by encoder 13 is then converted to a signal different from the input signal before processing, and is supplied to output terminal 15 together with the changed restriction flag "01". The signal is then recorded on recording medium T such as a magnetic tape by recording circuit REC including, e.g., a magnetic head through recording inhibition circuit 10 (to be described later). Meanwhile, when detection & discrimination circuit 12 determines that the restriction flag is "11" (no restriction), or (rank F), encoder 13 supplies the recording input signal to recording circuit REC through recording output terminal 15 and recording inhibition circuit 10 without executing the encoding operation, by using the ID signal, or changing the restriction flag.

The arrangement of a main portion of reproducing section II of this embodiment will be described with reference to FIG. 3. A signal reproduced from recording medium T by reproducing circuit PB including, e.g., a magnetic head (not shown) is supplied to reproducing input terminal 16, and is then supplied to recording rank discrimination circuit 17 and decoder 18. Recording rank discrimination circuit 17 discriminates rank E (recorded in rank R), rank F, or rank R from the reproduced signal. More specifically, if the signal is recorded during the encoding operation, it must be decoded during the reproduction operation. Thus, circuit 17 determines the presence/absence of the encoding operation, and causes decoder 18 to decode (e.g., descramble) the signal if the encoding operation has been performed (rank E). The decoding operation in decoder 18 is performed based on an ID signal output from the same ID signal generator 14 as that shown in FIG. 2. Only when the ID signal is the same as that used in the encoding operation during recording, can the signal be converted to a normal signal before encoding. As described above, since the ID signal generated by ID signal generator 14 is a signal inherent to the generator, when the signal supplied to input terminal 16 has not been encoded based on the ID signal generated by ID signal generator 14 shown in FIG. 2, i.e., when ID signals used in the reproducing and recording sections are not the same, decoder 18 performs a wrong decoding operation, and as a result, outputs an insignificant signal to reproducing processor 20 through reproducing output terminal 19. When circuit 17 discriminates rank F or R, decoder 18 does not execute the above decoding operation, and supplies the reproducing input signal to reproducing output terminal 19. Then, normal reproducing processing is performed by reproducing processor 20.

A recording restriction function as a characteristic feature of this embodiment will be described below.

In FIG. 1 described above, when detection & discrimination circuit 12 determines that the restriction flag of an input signal is "01" (rank E), recording inhibition circuit 10 inhibits the recording since this input signal is a signal reproduced from a copied recording medium (tape). Thus, an already copied recording medium (tape) can be prevented from being copied again. Recording can be prohibited by cutting off a recording signal and/or stopping the drive of the recording medium (travel in the case of tape).

This embodiment basically has the above-mentioned arrangements, and the components shown in FIGS. 2 and 3 can be achieved by various arrangements based on conventional techniques. Detailed arrangements of these components will be briefly described below. FIG. 4 shows an arrangement of ID signal generator 14. When a specific code signal, e.g., a signal of several (n) bits such as "010011 . . . 01", is used as an ID signal, jumper lines or switches 23 are selectively inserted between terminals 21 for transmitting the corresponding bits of the code signal and ground terminals 22, thereby obtaining the specific code signal. The insertion of jumper lines or switches 23 is randomly performed during manufacturing, so that $2^n$ code signals inherent to individual recording/reproducing systems can be generated. In another technique, a specific code signal can be stored in a read only memory (ROM). The ROM may comprise an electrically programmable ROM (EPROM), a Write Once ROM in which data can be electrically written only once, a mask ROM in which a code is determined upon LSI design, and the like.

FIG. 5 shows a detailed arrangement of encoder 13. Assuming that the above-mentioned code signal is output from ID signal generator 14, the code signal is then input to pseudo random series (PN) generator 24, and a PN signal is generated to have the code signal as an initial value. The PN signal is supplied to one input terminal of exclusive-OR gate 25. The other input terminal of exclusive-OR gate 25 receives a recording input signal supplied from input terminal 26 of encoder 13. As a result, a signal output from exclusive-OR gate 25 is converted to a scrambled signal which is different from the original input signal, and the scrambled signal is supplied to output terminal 27. The circuit shown in FIG. 5 can also be used as decoder 18. More specifically, if an identical code signal is supplied to PN generator 24 which has a timing that is equal to the signal supplied during encoding, the reproducing signal is descrambled by using the PN signal having the same code signal as that of the initial value, and the output signal from exclusive-OR gate 25 is converted to a signal equal to the input signal before encoding. As a technique for synchronizing the encoding and decoding timings, signals can be easily initialized at a starting portion of a predetermined number of blocks of a recording signal, e.g., of each track in the case of a recording/reproducing method using a rotary head for a tape-like recording medium. Such scrambling is executed in the case of rank R, and descrambling is executed in the case of rank E. When rank F or rank R upon reproduction is detected, the input signal can be directly supplied from another input terminal (not shown) to the output terminal, or the operation of PN generator 24 can be stopped. Even if rank R or E is detected, descrambling need not always be performed for all the input signals. For example if an input signal consists of a main signal component and a sub signal component for controlling recording/reproduction of the main signal, descrambling may only need to be performed for one or part of these signal components. Various other arrangements of encoder 13 or decoder 18 may be employed.

According to this embodiment, when an information source which is restricted from being copied is recorded by the arrangement described above, the information source is encoded based on an ID signal inherent to the individual recording/reproducing system. Thus, the signal recorded in this manner cannot be reproduced as a normal signal unless it is decoded based on the specific ID signal or unless it is reproduced by a recording/reproducing system using the identical ID signal as that in the recording apparatus. For this reason, illegal copying which benefits those other than the person owning the copyright, that allows reproduction by any recording/reproducing system, cannot be performed, thereby providing a rigid restriction on the illegal copying of tapes. Meanwhile, copying for personal use of users is not inhibited, thus meeting the users' requirements.

When an information source to be recorded has been encoded, copying from a copy tape can be inhibited since its recording is inhibited. Thus, a certain restriction can be provided to a user's personal use if so desired.

In this embodiment, the presence/absence of copy restriction is automatically discriminated from an information source, and the recording/reproducing system selectively processes this. Thus, no cumbersome operation is required for a user, resulting in good operability.

In this embodiment, the case has been exemplified wherein the information source is a digital signal. If the information source is an analog signal, the same basic arrangement remains the same and only some components need be slightly modified. For example, when a special signal is added to an ID code band at the upstream side of an audio band serving as an information source which is restricted to be copied, detection & discrimination circuit 12 shown in FIG. 2 detects and discriminates the presence/absence of the special signal, and the same processing as described above is performed in an analog manner in accordance with the discrimination result.

FIGS. 6 and 7 show a second embodiment of the present invention. The same reference numerals in FIGS. 6 and 7 denote the same parts as in the first embodiment, and a detailed description thereof will be omitted. In the first embodiment, when an ID signal used for encoding does not coincide with that used for decoding, decoder 18 performs a wrong decoding operation. In this case, a signal output from decoder 18 may become a signal which causes a loudspeaker to generate an uncomfortable sound or a signal which may damage an output circuit of reproducing processor 20. In order to prevent this, an unnecessary output signal is muted, as is well known Thus, this embodiment comprises an arrangement for discriminating whether or not the ID signal upon encoding coincides with that upon decoding in order to allow appropriate muting.

More specifically, as shown in FIG. 6, a recording section I has combiner 31, as an encoding technique, which is connected to the output terminal of encoder 13. An ID signal output from ID signal generator 14 is also supplied to combiner 31, so that the recording signal is recorded while being added with the ID signal. Such processing is easy when both the recording and ID signals are digital signals. In a reproducing section II, the added ID signal is detected from the reproducing signal by ID signal detector 32 connected to reproducing input terminal 16, and the detected ID signal is compared with an ID signal generated by ID signal generator 14 by comparator 33. If the comparison result indicates a noncoincidence, the output from decoder 19 is cut off by muting circuit 34 connected to the output terminal of decoder 18. If the comparison result of comparator 33 is displayed on display 35, an alarm of reproduction rejection can be given to a user. In this manner, a practical recording/reproducing system can be provided while achieving the same effect as in the first embodiment.

Further, the recording section I is arranged such that the ID signal added by the reproducing section II can be detected by detection & discrimination circuit 12. If this detection is made, recording may be inhibited by recording inhibition circuit 10. Thus, a copy tape can be prevented from being copied again.

Figure 8:
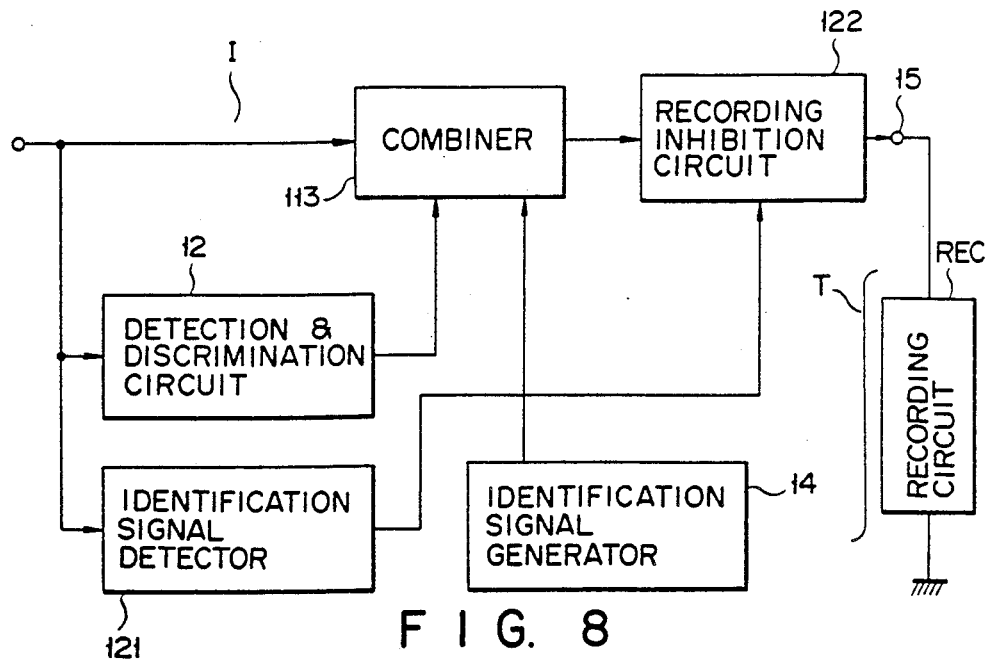
FIG. 8 is a block diagram showing an arrangement of a recording section of a recording/reproducing system according to a third embodiment of the present invention.
Figure 9:
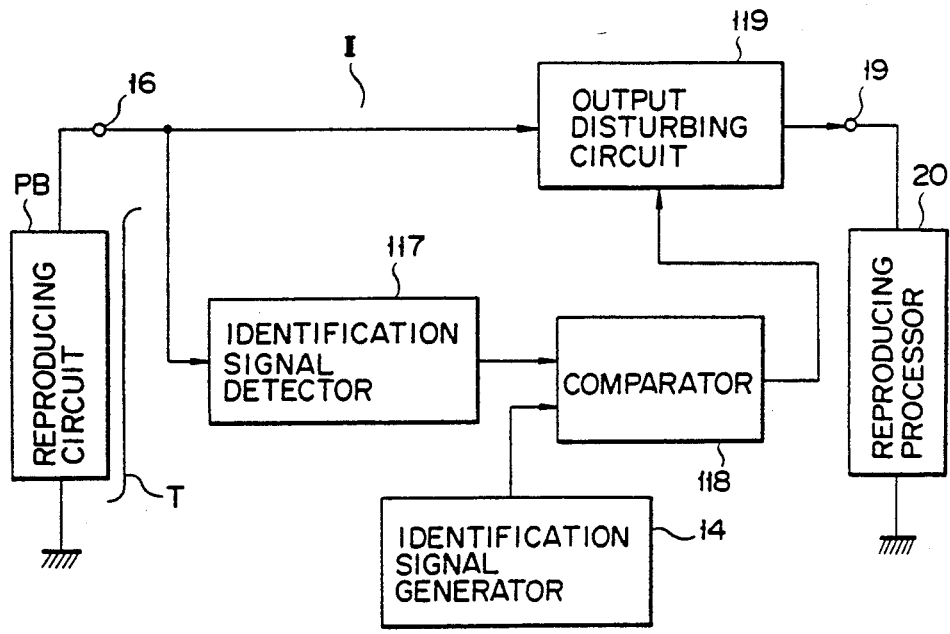
FIG. 9 is a block diagram showing an arrangement of a reproducing section of the third embodiment.

A third embodiment shown in FIGS. 8 and 9 differs from the above embodiments in that it employs a direct switch technique rather than an encoding (scrambling) technique. Only this difference will be described below.

In a recording section shown in FIG. 8, an input recording signal including the ID signal is supplied from recording input terminal 11 to detection & discrimination circuit 12 and combiner 113. Detection & discrimination circuit 12 detects the restriction flag from the input recording signal, and discriminates whether the detected restriction flag is "0" or "1". Circuit 12 controls combiner 113 in accordance with the discrimination result. More specifically, when the restriction flag is "0" (presence of restriction), or (rank R), circuit 12 causes combiner 113 to add an ID signal (to be described later) which is inherent to ID signal generator 14 to the input signal. The recording signal, with the ID signal output from combiner 113, is supplied to output terminal 5, and is then recorded on recording medium T by recording circuit REC. On the other hand, if circuit 12 determines that the restriction flag is "1" (no restriction), or (rank F), combiner 113 does not execute addition of the (ID signal inherent to generator 14), and directly supplies the input signal to output terminal 15.

An arrangement of a reproducing section II of this embodiment will now be described with reference to FIG. 9. A signal reproduced from recording medium T by reproducing circuit PB is supplied to reproducing input terminal 16, and then to ID signal detector 117 and output disturbing circuit 119. ID signal detector 117 detects, from the reproduced signal, the ID signal recorded in rank R, and supplies the detected ID signal to comparator 118. Comparator 118 compares the detected ID signal with an ID signal output from ID signal generator 14, and controls output disturbing circuit 119 in accordance with the comparison result. More specifically, when the ID signals input to comparator 118 do not coincide with each other, propagation of the reproduced signal to output terminal 19 is disturbed by output disturbing circuit 119. A noncoincidence between the two ID signals means that the reproduced signal was recorded in rank R, and was recorded by an apparatus different from a reproducing apparatus. The ID signal generated by ID signal generator 14 is a signal inherent to the generator and if a signal supplied to reproducing input terminal 16 does not include an ID signal generated by generator 14 shown in FIG. 8, (i.e., if a reproducing apparatus is not the same as a recording apparatus), the comparison result by comparator 118 will not indicate a coincidence. However, if the comparison result indicates a coincidence, or the reproduced signal has been recorded in rank F, comparator 118 stops the disturbing operation of output disturbing circuit 119, and supplies the input signal to output terminal 19. Then, normal reproduction processing is executed by reproducing processor 20.

Therefore, as long as a signal is not reproduced by the same apparatus as a copying apparatus, a normal signal cannot be reproduced.

A recording restriction function (the characteristic feature of this embodiment) will be described below.

When the reproducing input signal already includes the ID signal by the above-mentioned technique, it is detected by ID signal detector 121, and supplied to recording inhibition circuit 122 (FIG. 8) which cuts off a signal path, or stops traveling of recording medium T when it is a tape, or performs both these operations, thereby inhibiting recording. Thus, copied recording medium T can be prevented from being copied again.

FIGS. 10 and 11 show detailed arrangements of output disturbing circuit 119. In FIG. 10, switch 43 is arranged between input and output terminals 41 and 42 of output disturbing circuit 119. When the output from comparator 118 is a disturbing execution signal (indicating a noncoincidence between two ID signals), switch 43 simply cuts off the output. In FIG. 11, when the disturbing execution signal is output from comparator 118, pseudo random series (PN) generator 51 generates a PN signal in response to the signal, and supplies the PN signal to one input terminal of exclusive-OR gate 52. The other input terminal of exclusive-OR gate 52 receives a reproduced signal. Thus, the signal output from exclusive-OR gate 52 is converted to a scrambled signal different from the reproduced signal, and is then supplied to output terminal 42. If a coincidence is found or rank F is detected, other processing can be performed. For example, the reproduced signal may be directly supplied to the output terminal from another input terminal (not shown) or the operation of PN generator 51 may be stopped Even if a noncoincidence is detected, the above-mentioned scrambling need not always be performed for all the reproduced signals. For example, assuming that a reproduced signal consists of a main signal component and a sub signal component for controlling reproduction of the main signal (e.g., a signal for determining a fundamental mode of the main signal component, e.g., a sampling frequency, the number of channels, emphasis characteristics, or the like), the scrambling may be performed for the sub signal component. Various other arrangements of output disturbing circuit 119 may be employed.

Another detection technique of ID signal detector 117 may be employed in the situation where an ID signal is not often easily detected if it is not a predetermined signal. In this case, the ID signal is recorded together with predetermined detection data. For example, the ID signal is inserted in a portion of a recording format after given data such as "0101" has been added to the starting portion of the ID signal Upon reproduction, the ID signal is detected based on the given data.

Although not shown, another technique for discriminating a rank (R or F) of a reproduced signal may be adopted. In this technique, when a signal is recorded in rank R, a predetermined signal portion which does not influence a main signal is converted to a given signal (e.g., "11"), and in the case of rank F, an all-"0" signal is recorded in a portion in which the ID signal is to be recorded, thereby allowing discrimination of the rank.

According to this embodiment, when a copy restricted information source is recorded by the above arrangement, it is recorded after an ID signal inherent to an individual recording/reproducing system has been added thereto The ID signal of the signal recorded in this manner is checked upon reproduction, and unless the specific ID signal is detected, (i.e., unless the signal is reproduced by the same apparatus as a recording apparatus), it cannot be reproduced as a normal signal. For this reason, when the above arrangement is provided to an identical type of recording/reproducing system, illegal copying for benefits, that allows reproduction by any recording/reproducing system, cannot be performed, thus providing a strict restriction to copying. Meanwhile, copying for personal use is not inhibited, thus meeting user's requirements.

When an information source to be recorded includes an ID signal, since its recording is inhibited, copying for personal use can be subjected to a certain restriction if so desired.

In the third embodiment, the case has been exemplified wherein an ID signal inherent to the apparatus is used as an index signal. However, the present invention is not limited to this. For example, a predetermined pattern common to several apparatuses used by a user may be employed as an ID signal.

As still another embodiment, the following arrangement may be employed Detection & discrimination circuit 12 in the above embodiments discriminates the presence/absence of copy restriction in accordance with a signal included in an information source. Alternatively, copy restriction processing may be executed by discriminating a signal from keyboard 35 (see FIGS. 2 and 6) of the recording/reproducing system. In this manner, even when an information source which is not restricted to be copied is recorded, a restriction can be provided depending on a user's will, so that a source recorded by a user cannot be easily reproduced by a third party.

In the above embodiments, if recording inhibition circuit 10 or 122 is omitted, a record restriction effect can be provided. More specifically, in the reproducing section II in the above embodiment, recording medium T can be reproduced only by an apparatus having the same ID signal as that added upon recording (i.e., only by a user of the corresponding recording/reproducing system). Otherwise, reproduction is impossible. Thus, even though an information source is again copied from copied recording medium for the purpose of illegal use, the again copied source cannot be reproduced by another apparatus, and in practice, such copying is nonsense.

ID signal generator 14 in the above embodiments is incorporated in the recording/reproducing apparatus. The ID signal generator may be arranged as a unit separate from the recording/reproducing apparatus, and may be detachably arranged with the apparatus. In this arrangement, a range of restriction which inhibit reproduction of a recording medium copied by an apparatus different from the recording apparatus is moderated, and a user can only reproduce the recording medium when he possesses an ID signal generator unit used upon recording. Such an arrangement is effective when a user manages a plurality of recording/reproducing apparati.

In this invention, an ID signal generator used upon recording need not always be used upon reproduction. It need only discriminate whether an ID signal added upon recording is one inherent to the reproducing apparatus. For example, when an information source is subjected to predetermined conversion (modulation) and recorded after an ID signal is added thereto upon recording, the ID signal detected upon reproduction may be different from the original ID signal. In this case, a signal to be compared with the detected ID signal is one corresponding to conversion upon recording.

A signal which is encoded by a special technique need only be decoded by the corresponding special technique, and a signal used in the special technique is an ID signal. For this reason, an identical ID signal need not be used during encoding and decoding. For example, when a decoder itself is designed based on a special technique, a signal used therein may be different because it associated with a signal used upon encoding.

Various other embodiments of the present invention may be employed in addition to the above embodiments, and the same effects as described above can be obtained as long as they are made within the spirit and scope of the invention.

As described above, a recording/reproducing system of the present invention can selectively inhibit copying with a predetermined restriction, and can meet the user's requirements of a recording/reproducing operation.

A recording apparatus of the present invention can inhibit copying of a copied recording medium and restrict a recording operation to personal use.

An application or service system for using a recording/reproducing system comprising the abovementioned recording restriction function will be described below. An application or service system is desired to eliminate an inconvenience since personal recording/reproducing is currently permitted in only an identical recording/reproducing system. Recently, personal recording/reproduction of an information source is not limited to that performed only by a single recording/reproducing system installed in a user's home. Average users normally selectively utilize a home system, a car-mount system, a portable system, and the like, depending on their needs.

In an application or service system proposed in this embodiment, one or a plurality of ID cards (including magnetic card, and an IC card) or keys (including electronic keys and magnet keys), having an ID code corresponding to an ID signal for each recording/reproducing system described in each of the above embodiments are given to a user. Thus, for personal use, a user inserts the ID card or key to access a variety of systems.

FIG. 12 schematically shows a magnetic card type recording/reproducing system. An ID code corresponding to the above-mentioned ID signal is magnetically recorded on magnetic stripe 202 of magnetic card 201. Magnetic card 201 is inserted in card insertion port 204 of recording/reproducing unit 203. Recording/reproducing unit 203 incorporates the recording and reproducing sections of the above embodiments, and a card reader shown in FIG. 13. The ID code recorded on magnetic stripe 202 of magnetic card 201, which is read by magnetic head 205, is supplied to register 209 through amplifier 206, demodulator 207, and data separator 208. In this case, a card No., a manufacturer's code, or the like may be utilized in addition to the ID code, as needed. Register 209 acts as identification signal generator 14 in each of the above embodiments. The ID code from register 209 is compared by comparator 33 or 118 with the detected ID code from ID signal detector 32 or 117 in each of the above embodiments, as shown in FIGS. 7 and 9.

Figure 14:
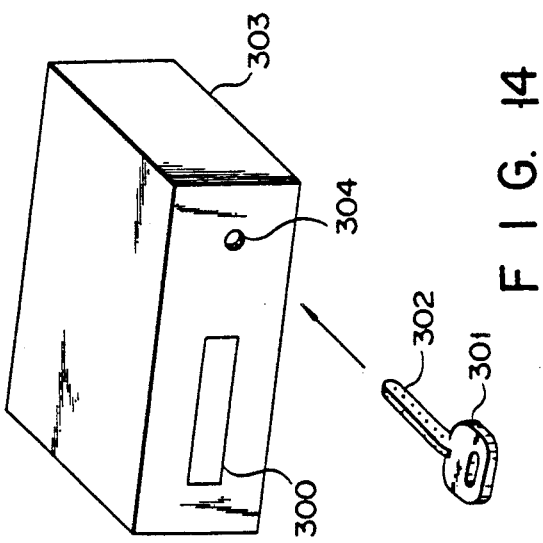
FIG. 14 is a perspective view showing another application or service system of the present invention.

FIG. 14 schematically shows a magnet key system. Magnet key 301 is provided with predetermined ID code 302 and inserted in key insertion port 304 of recording/reproducing unit 303. Thereafter, ID code generation corresponding to the above-mentioned magnetic card system is performed although not shown.

In FIGS. 12 and 14, reference numerals 200 and 300 denote an insertion slot for recording media for recording/reproducing an information source.

Alternatively, ID signal generator 14 may be omitted, and an ID code fetched from the magnetic card or the like may be converted to an ID signal.

Figure 13:
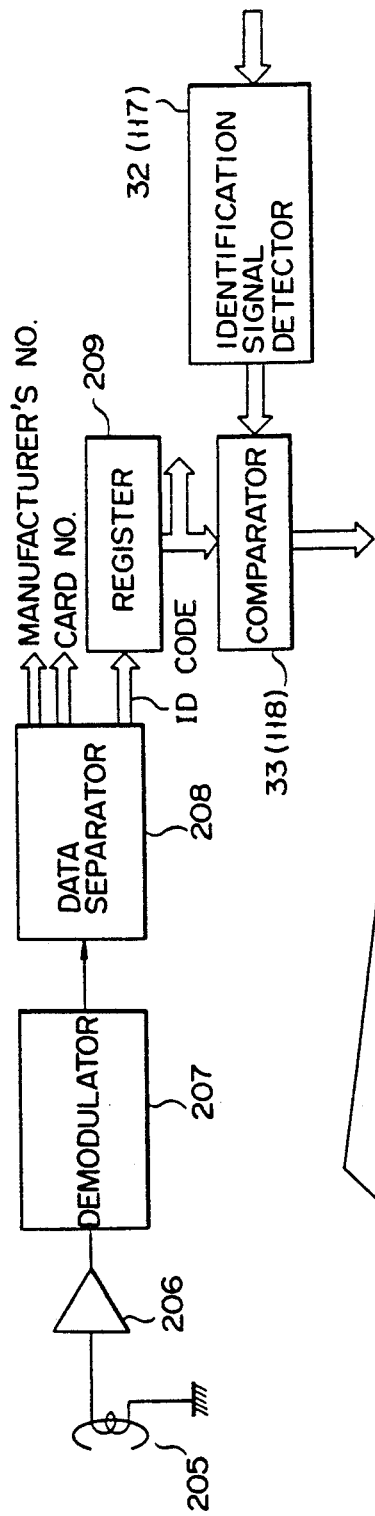
FIG. 13 is a block diagram of a card reader incorporated in a recording/reproducing unit shown in FIG. 12.
Figure 15:
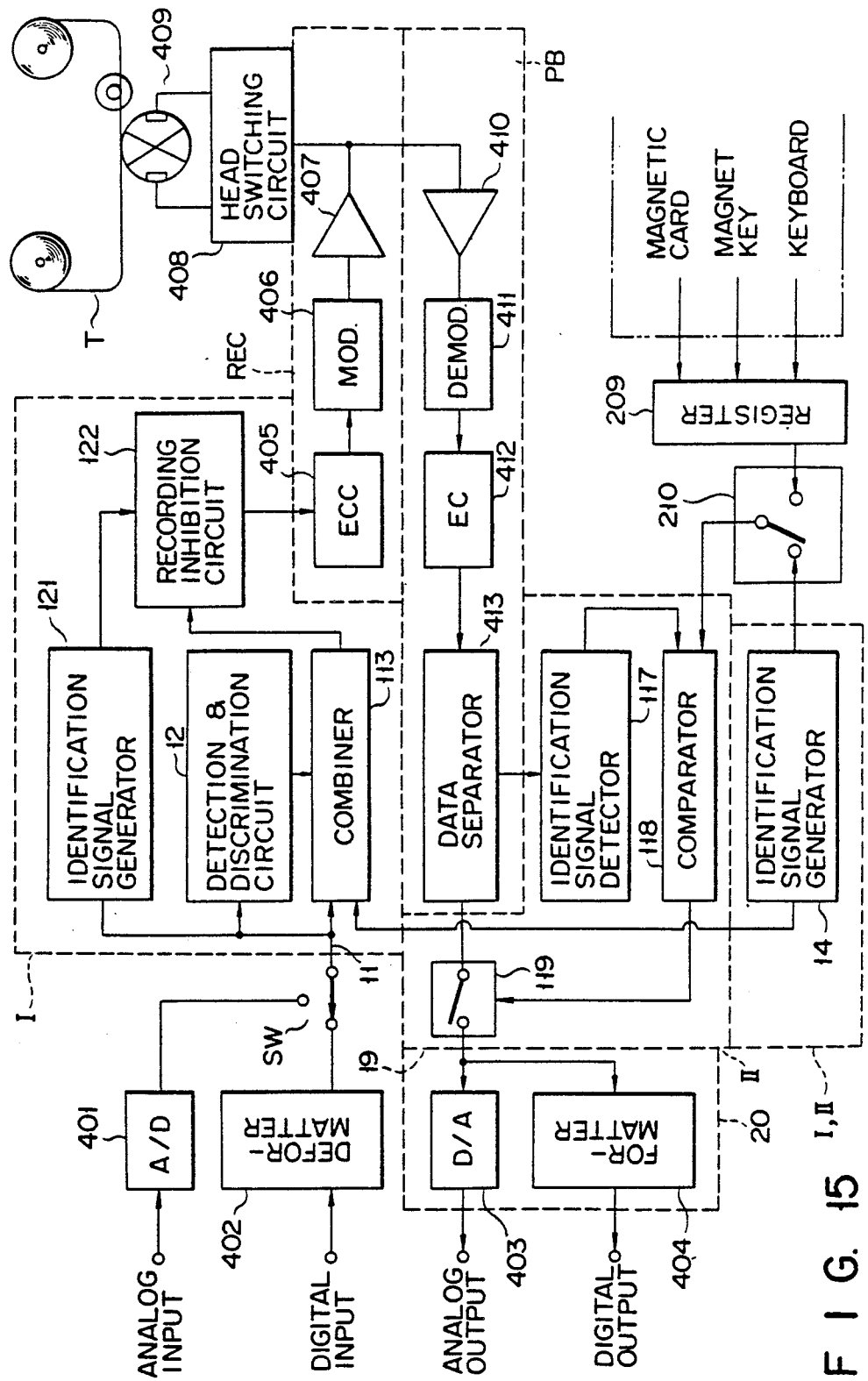
FIG. 15 is a block diagram showing a DAT to which the recording/reproducing system of the present invention and its application or service system are applied.

FIG. 15 shows an embodiment when the arrangements shown in FIGS. 8, 9, and 13 are applied to a DAT (digital audio tape recorder). An analog or digital input selected by switch SW upon recording is input to combiner 113 through A/D converter 401 or deformatter 402. The description of recording section I employs that of FIG. 8. The output from recording inhibition circuit 122 is recorded on tape T as a recording medium by rotary head 409 through error code adding circuit 405, modulator 406, and amplifier 407. Rotary head 409 is switched by head switching circuit 408.

During reproduction, a reproduced signal from rotary head 409 is separated into audio data and an ID signal through amplifier 410, demodulator 411, error correction circuit 412, and data separator 413, which constitute reproducing circuit PB. The ID signal is supplied to ID signal detector 117 of reproducing section II. The description of reproducing section II employs that of FIG. 9. The audio data is supplied to reproducing processor 20 through output disturbing circuit 119. Reproducing processor 20 has D/A converter 403 for obtaining an analog output, and formatter 404 for obtaining a digital output.

ID signal generator 14 is commonly used for recording and reproducing sections I and II. When the application or service system described above is employed, an ID code input from a magnetic card, a magnet key, a keyboard, or the like, can be fetched by comparator 118 through register 209 and switch 210.

What is claimed is:

1. A recording apparatus comprising;
   input means for inputting a signal to be recorded on a recording medium, said signal including at least an information source;
   identification signal generating means for generating an identification signal particular to the recording apparatus;
   detection means for detecting whether a recording restriction signal is present in the information source input by said input means;
   processing means for outputting a combination signal of the information source input by said input means and the identification signal generated by said identification signal generating means when said detection means detects that the recording restriction signal is present and for outputting the information source input by said input means when said detection means detects that the recording restriction signal is not present; and
   recording means for recording the output of said processing means.

2. A recording apparatus, comprising:
   input means for inputting a signal to be recorded on a recording medium, said signal including at least an information signal;
   identification signal generating means for generating an identification signal particular to the recording apparatus;
   detection means for detecting whether a recording restriction signal is present in the information signal input by said input means;
   processing means for outputting a combination signal of the information signal input by said input means and the identification signal generated by said identification signal generating means when said detection means detects that the recording restriction signal is present and for outputting the information signal input by said input means when said detection means detects that the recording restriction signal is not present;
   recording means for recording the output of said processing system;
   identification signal detection means for detecting whether a component equal to the identification signal generated by said identification signal generating means is present in the signal input by said input means; and
   recording inhibition means for inhibiting said recording means from recording at least the information signal when said identification signal detection means detects the presence of the component equal to the identification signal.

3. An apparatus according to claim 2, wherein said recording inhibition means includes switch means for switching off the output from the processing means to the recording means.

4. An apparatus according to claim 2, wherein said processing means includes encoding means for at least partially encoding the recording signal based on the identification signal.

5. An apparatus according to claim 4, wherein said encoding means includes means for scrambling the recorded signal.

6. A reproducing apparatus comprising:
   reproduction means for reproducing a signal from a recorded medium having an information signal or a combination signal of the information signal and a certain identification signal, the certain identification signal including a content particular to said reproducing apparatus or particular to another reproducing apparatus;
   detection means for detecting whether the certain identification signal is present in the signal reproduced by said reproduction means;
   identification signal generating means for generating an identification signal having a content particular to said reproducing apparatus;
   determination means for determining whether the content of the certain identification signal reproduced by the reproduction means coincides with the content of the identification signal generated by said identification signal generating means when said detection means detects the certain identification signal is present in the signal reproduced by the reproduction means; and
   processing means for (1) outputting at least the information signal in the signal reproduced by said reproduction means when (a) said detection mans detects that the certain identification signal is not present and (b) said determination means determines that the content of the certain identification signal coincides with the content of the identification signal generated by said identification signal generating means and (2) inhibiting the output of at least the information signal in the signal reproduced by said reproduction means when said determination means determines that the content of the certain identification signal does not coincide with the content of the identification signal generated by said identification signal generating means.

7. An apparatus according to claim 1, wherein said processing means includes output disturbing means.

8. An apparatus according to claim 1, wherein said processing means includes means for decoding the reproduced signal based on the identification signal.

9. A service system for a recording apparatus having a record restriction function for recording a recording signal on a recording medium, comprising:
   means for detecting whether an identification code for a recording restriction is present in the recording signal on the recording medium;
   a recording unit for adding the identification code for a recording restriction to the recording signal on the recording medium including a recording restriction signal, if the detecting means does not detect the identification code in the recording signal on the recording medium;
   identification code means, detachable with said recording unit, for providing the identification code particular to said recording unit; and
   means for inhibiting the recording of the recording signal on the recording medium if the detecting means does detect the identification code in the recording signal.

10. A service system for a recording apparatus having a record restriction function for recording a recording signal on a recording medium, comprising:
- means for detecting whether an identification code for a recording restricting is present in the recording signal on the recording medium;
- a recording unit having identification means for selectively recording the recording signal including a recording restriction signal and the identification code for recording restriction, if the detecting means does not detect the identification code in the recording on the recording medium; and
- identification code means, detachable with said recording unit, for providing the identification code particular to said identification means; and
- means for inhibiting the recording of the recording signal on the recording medium if the detecting means does detect the identification code in the recording signal.

11. A service system for a reproducing apparatus having a reproducing restriction function for recording a reproducing signal from a recording medium, comprising:
- means for detecting whether an identification code for a reproducing restriction is present in the reproducing signal for the recording medium;
- a reproducing unit which includes means for selectively processing the reproduced signal including a reproducing restriction signal and the identification code for reproducing restriction, if the detecting means does not detect the identification code in the reproducing signal from the recording medium;
- identification code means, detachable with said reproducing unit, for providing the identification code particular to said processing means; and
- means for inhibiting the recording of the reproducing signal from the recording medium if the detecting means does detect the identification code in the reproducing signal.

12. A method of using a recorder, comprising the steps of:
- inputting a signal to be recorded on a recording medium;
- generating a recorder identification signal particular to the recorder;
- detecting whether the input signal includes a restriction signal;
- recording a combination of the input signal and the identification signal if the restriction signal is detected; and
- recording the input signal if the restriction signal is not detected.

13. A method of recording a prerecorded information signal from a prerecorded combination signal output by a reproducer and including at least the prerecorded information signal and a prerecorded identification signal using a recorder and a recording medium containing the prerecorded combination signal, comprising the steps of:
- inputting, from the reproducer to the recorder, the prerecorded combination signal;
- generating a recorder identification signal particular to the recorder;
- segregating the prerecorded identification signal from the prerecorded information signal in the combination signal;
- comparing the prerecorded identification signal with the recorder identification signal; and
- recording the prerecorded information signal if the prerecorded identification signal is substantially identical to the recorder identification signal.

14. A method according to claim 13, further including the step of:
- inhibiting the recording steps if the prerecorded identification signal is not substantially identical to the recorder identification signal.

15. A recording apparatus having a function of releasing a recording restriction under a predetermined condition, said recording apparatus comprising:
- input means for inputting a signal to be recorded on a recording medium, said signal including at least an information signal having a recording restriction signal and an index signal therein or not;
- index signal generating means for generating an index signal;
- detection means for detecting whether the recording restriction signal is present in the information input by said input means;
- processing means for outputting a signal into which the index signal generated by said index signal generating means is combined with the information input by said input means when said detection means detects that the recording restriction signal is present, and for outputting the information input by said input means as it is without being combined with the index signal when said detection means detects that the recording restriction signal is not present;
- recording means for recording the output from said processing means;
- index signal detection means for detecting whether the index signal is present in the information input by said input means; and
- recording inhibition control means for inhibiting said recording means from recording at least the information when said index signal detection means detects the presence of the index signal, and for not inhibiting said recording means from recording the information, regardless of the presence or absence of said recording restriction signal, when said index signal detection means does not detect the presence of the index signal.

* * * * *